(12) United States Patent
Hall et al.

(10) Patent No.: US 10,933,763 B2
(45) Date of Patent: Mar. 2, 2021

(54) OVERHEAD PROGRAMMABLE BATTERY CHARGER

(71) Applicants: David R. Hall, Provo, UT (US); Christopher Jones, Spanish Fork, UT (US); Casey Webb, Spanish Fork, UT (US)

(72) Inventors: David R. Hall, Provo, UT (US); Christopher Jones, Spanish Fork, UT (US); Casey Webb, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 125 days.

(21) Appl. No.: 15/940,280

(22) Filed: Mar. 29, 2018

(65) Prior Publication Data
US 2019/0299801 A1    Oct. 3, 2019

(51) Int. Cl.
| | |
|---|---|
| *H02J 7/00* | (2006.01) |
| *B60L 53/30* | (2019.01) |
| *H02J 7/14* | (2006.01) |
| *B60L 53/14* | (2019.01) |
| *H01M 10/42* | (2006.01) |

(52) U.S. Cl.
CPC ............ *B60L 53/30* (2019.02); *B60L 53/14* (2019.02); *H02J 7/1446* (2013.01); *B60L 2230/12* (2013.01); *B60L 2230/16* (2013.01); *B60L 2230/40* (2013.01); *H01M 10/4257* (2013.01); *H02J 7/00034* (2020.01)

(58) Field of Classification Search
USPC ....... 320/104, 105, 106, 107, 109, 128, 134, 320/153
See application file for complete search history.

(56) References Cited

U.S. PATENT DOCUMENTS

| | | | | |
|---|---|---|---|---|
| 3,624,481 | A * | 11/1971 | Macharg | H02J 7/008 320/153 |
| 5,150,031 | A * | 9/1992 | James | H02J 7/00036 320/164 |
| 6,275,009 | B1 * | 8/2001 | Sakakibara | H02J 7/0004 320/134 |
| 8,553,159 | B2 * | 10/2013 | Carmichael | H04N 5/4403 320/108 |
| 9,728,991 | B2 * | 8/2017 | Jagenstedt | H02J 7/007 |
| 10,132,876 | B2 * | 11/2018 | Bell | B60L 53/36 |
| 10,396,586 | B1 * | 8/2019 | Chen | H02J 7/00034 |
| 2004/0169489 | A1 * | 9/2004 | Hobbs | B60L 3/0046 320/104 |
| 2006/0028178 | A1 * | 2/2006 | Hobbs | B60L 3/0046 320/128 |
| 2006/0145659 | A1 * | 7/2006 | Patino | H02J 7/025 320/108 |

(Continued)

*Primary Examiner* — Brian Ngo

(57) ABSTRACT

An overhead battery charger is disclosed. The overhead battery charger includes a source of electric power, for example an electrical outlet, as well as a power cord connected to the source of electric power. At least one battery connection device, such as alligator clamps, is attached to the power cord, and a controller adapted to adjust voltage, current, or both, is available at the battery connection device. In addition, a remote device, such as a smart phone, tablet, or computer, runs an app and sends signals to direct the adjustments made by the controller.

23 Claims, 3 Drawing Sheets

(56) References Cited

U.S. PATENT DOCUMENTS

| | | | |
|---|---|---|---|
| 2006/0191727 A1* | 8/2006 | Usami | B60L 58/30 180/65.245 |
| 2010/0102775 A1* | 4/2010 | Chander | B60L 53/31 320/109 |
| 2011/0090726 A1* | 4/2011 | Brotto | H02J 7/0065 363/131 |
| 2011/0251753 A1* | 10/2011 | Saito | B60L 53/14 701/31.4 |
| 2011/0258112 A1* | 10/2011 | Eder | G06Q 20/10 705/39 |
| 2012/0206104 A1* | 8/2012 | Tsuchiya | H02J 3/32 320/134 |
| 2013/0214730 A1* | 8/2013 | Lu | H02J 7/007 320/107 |
| 2014/0312848 A1* | 10/2014 | Alexander | H02J 7/0013 320/134 |
| 2014/0352896 A1* | 12/2014 | Han | E06B 9/68 160/310 |
| 2016/0046199 A1* | 2/2016 | Butler | H02J 7/0004 320/106 |
| 2016/0049819 A1* | 2/2016 | Butler | H02J 7/0054 320/105 |
| 2017/0005503 A1* | 1/2017 | Kogler | H02J 7/007 |
| 2017/0222463 A1* | 8/2017 | Pullen | H02J 7/0072 |

\* cited by examiner

OVERHEAD PROGRAMMABLE BATTERY CHARGER

TECHNICAL FIELD

This invention relates generally to battery chargers and specifically to battery chargers that can be programmed.

BACKGROUND

Batteries are a useful, mobile energy source. Even vehicles that are powered by gasoline engines need a battery to start those engines. Many vehicles include means, such as an alternator, for recharging such starting batteries. However, often times users will inadvertently drain their starting battery. In other instances, batteries get old and do not hold a charge as well as when new. In these cases, the batteries need to be recharged so that they can start the engine on the vehicle.

Many chargers for car batteries are on the market. These chargers are typically plugged into a standard outlet and feed DC power to the car battery over a period of time. Often, these car battery chargers are large and heavy, making them cumbersome and difficult to move around. As such, users often prefer to keep them stored out of the way, making it inconvenient to bring them out when needed. Unless there happened to be a table or work bench close to the vehicle with the dead battery, the charger would typically have to rest on the garage floor. Moreover, the user needed to find an outlet to plug the charger into that was near enough to where the vehicle battery that needed charging sat or be required to use a heavy-duty extension cord.

Older car battery chargers were designed to charge at a fixed current level. Often, there was no means of reading when a battery was fully charged and automatically shut off when a vehicle battery was fully charged. The charging process was relatively slow, requiring around 14-16 hours to fully charge a battery. Users of these older models needed to be diligent to make sure they shut off their car battery charger before overcharging and ruining their battery.

Newer models of battery chargers have been designed to provide a rapid charge, although a slow charge can still be beneficial for a number of reasons. In addition, some newer models include microprocessors to shut off charging before a battery overcharges, while allowing users to adjust the voltage.

Another issue is the proliferation of batteries that need charging in the average garage. Everything from yard appliances, like lawn mowers, and electric powered vehicles, like golf carts and electric cars, typically need their own battery chargers.

SUMMARY

In a first aspect, the disclosure provides an overhead battery charger, which includes a source of electric power, such as a power outlet, a power cord connected to the source of electric power, and at least one battery connection device, such as an alligator clamp. The overhead battery charger also comprises a controller which is adapted to adjust the current, the voltage, or both either during or before a user has begun charging their battery with the overhead battery charger. Finally, the overhead battery charger includes a controller adapted to receive signals from a remote device, such that the controller makes adjustments to the voltage, current, or both depending on the signals received from the remote device.

In a second aspect, the disclosure provides an overhead battery charger comprised of selectable current level patterns, wherein a user may select several current levels for a single recharge. A user also selects an amount of time to charge at each current level, or to charge at a current level until the battery reaches a certain capacity. A user may also select a voltage level pattern comprised of several varying voltage levels, and may determine the amount of time that the overhead battery charger charges at each selected voltage level, which voltage levels are cycled through during a single recharging of a battery. The overhead battery charger may store the current and voltage level patterns, such that a user may reselect the predetermined patterns without reselecting the preferred voltage and current levels. In another embodiment, the current level, voltage level, or both remain constant during charging, and in another embodiment a manufacturer predetermines the current level pattern and voltage level pattern that will transpire during charging. A user may make adjustments to the voltage level or the current level as the overhead battery charger is charging a battery. The overhead battery charger is adapted to attach to an electric vehicle, a vehicle starting battery, or a battery of an appliance or tool.

In a third aspect, the disclosure provides an overhead battery charger wherein the battery charger is comprised of mounting hardware to mount the overhead battery charger to a wall or ceiling. It is also comprised of a housing for the power cord. In an additional aspect, the remote device is a smart phone running an app.

In a fourth aspect, the power cord is lowered or raised in response to input from the remote device, or in response to voice commands.

Furthermore, the disclosure provides an overhead battery charger wherein the battery charger is adapted to perform load tests, jump a battery, recondition a battery, and connect to more than one type of battery. Additionally, the overhead battery charger is comprised of a temperature sensor and a sensor for detecting various gases.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1A:
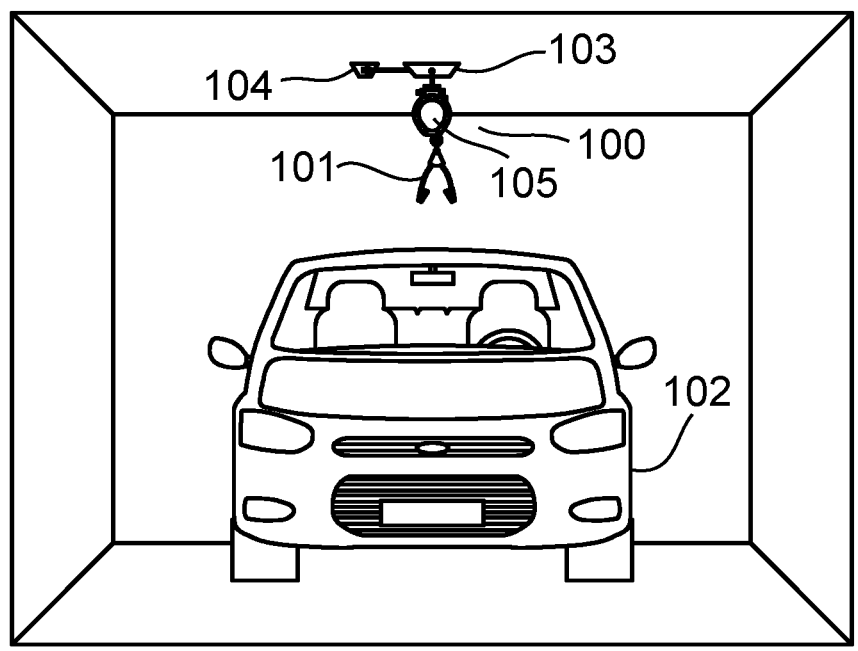
FIG. 1A is a front view of the overhead battery charger attached to an overhead.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

The overhead battery charger can be controlled via controls on the overhead battery charger, preferably attached to the lower end of the power cord for convenience of the user. Alternatively, the controller on the overhead battery charger is configured with a microphone and process so that it can receive instructions by a user's voice.

Preferably, the controls are sent via short-range wireless connection. As such, a user does not need to be in the same room as their vehicle after they have connected the battery connection devices to the vehicle battery. The user can leave and monitor the progress of the battery charge via the remote device, which may be a smart device, such as a cell phone or tablet. The user will receive alerts when their car battery is fully charged so as to avoid overcharging. Additionally, a user can control the current level of the charge via the short-range wireless connection. For example, a user may determine that when the battery has been fully depleted, they would like to start with a 2 amp trickle charge, and at 50% capacity—that is when the battery is halfway to being fully recharged—switch to a 12 amp charge to speed up the charging process. When the charger is controlled by a remote device, the user can make these changes without returning to the vehicle via the remote device.

Most preferably, the overhead battery charger is connected to a home WiFi network and thereby connected to the internet. As such, a user may access and control the battery charger from a location beyond the home WiFi network.

Preferably, the overhead battery charger is adapted to perform load tests. Load tests are useful in that they determine the health of a battery and can do so before it is discharged. A load test tests a battery's output voltage when it is both loaded and. That is, the load test determines the output voltage of the battery when at rest (unloaded) and then simulates the load required to start a motor to test the output voltage of the battery when working to start a vehicle (loaded). Additionally, the overhead battery charger may analyze the charging system, based on the results of the load test, and display this information on the remote device such as a smart phone running an app. Thus, if a user is having difficulties with their vehicle dying, they can determine if it is the result of a faulty or dying battery, or the result of a failing charging system such as an alternator.

When attaching a battery charger to a vehicle, it is important to consider the voltage of the battery. For example, many motorcycles have a 6-volt battery and it can be dangerous to charge them at 12 volts. If a 6-volt battery is charged at 12 volts, the battery may quickly overheat and overcharge, which may result in a ruined battery or potentially a fire. The overhead battery charger, once connected to a battery, determines the voltage of the battery and will charge the battery at its voltage to protect the battery and prevent overheating and overcharging. By charging at a lower voltage, the health and longevity of the battery is also preserved.

The overhead battery charger functions as AC voltage comes into the printed circuit board and is converted into DC voltage. The DC voltage is passed through the power cables to the battery at a certain current level or amperage, which is determined by the user. The voltage can also be adjustable and can be set by a user to 6 volts, 12 volts, or 24 volts—or to any voltage between 6 volts and 24 volts. The overhead battery charger can be used with typical automotive batteries such as lead acid, lithium-ion, or gel cell batteries, or deep-cycle batteries, such as marine batteries.

In one example, a battery in a Toyota Camry, (a 12-volt battery) once depleted or dead, will likely need to be trickle charged until the battery is recharged to about 30-40% capacity. The benefits of charging a battery slowly, that is, at a low current level or with fewer amps, are that the battery life is elongated and the battery is able to fully recharge.

Slowly charging a battery also prevents a battery from becoming unusable—especially in instances where the vehicle is used infrequently or is stored for long periods of time in between usage—for example an ATV during the winter months or a snowmobile during summer months. When a vehicle is not used for a long period of time, the battery slowly discharges. This problem is exacerbated by modern vehicles with computers and other power appliances that drain energy even when a vehicle is shut off. In addition, a trickle charge or slow charge helps to prevent the formation of sulfide on the lead plates of the battery, which can lead to permanent battery damage and ultimately render a battery unusable. For these reasons, a trickle charge, or a partial trickle charge, is beneficial when recharging batteries.

In the case of a dead battery in a Toyota Camry, a user can program a current level pattern such that the overhead battery charger charges the battery at 2 amps until it is 30% full, 10 amps until the battery is 90% full, and then 2 amps again until the battery is fully charged. Beginning and ending with a trickle charge is advantageous because charging at lower amps allows for a battery to charge to its fullest capacity. Additionally, by beginning and ending the charging process with a trickle charge, a battery's lifetime or longevity can be increased. When a battery is not recharged to its full capacity, battery life is shortened, often because sulfide begin to form in the batteries.

In another example, a battery in a Ford Fusion (a 12-volt battery) is not dead but depleted to about 50% full. A user can create a current level pattern wherein the overhead battery charger charges the battery at 8 amps until the battery is 90% full, and then switches to 1 amp until the battery is completely full. In another example, a vehicle battery is completely discharged. A user selects a current level pattern that begins at 8 amps. This is useful because at 8 amps, a battery will quickly charge and be ready for use within a few hours, although the battery will not be fully charged. If a user needs to use their vehicle immediately or within a few hours, they can detach the overhead battery charger from their vehicle once it is partially charged. Then, after using the vehicle, a user can reattach the overhead battery charger and it will resume the current level pattern. That is, if the current level pattern was set to charge at 8 amps for four hours, and then 2 amps for eight hours, and the user charged their vehicle for four hours before detaching it, the pattern would resume and begin charging at 2 amps after the vehicle was reconnected to the overhead battery charger. Additionally, after reattaching the vehicle to the overhead battery charger, the user could program and begin a new current level pattern or select to finish charging the vehicle battery at a constant current level.

Similarly, a battery can be charged over a range of voltages. A higher voltage will charge a battery faster, but may cause damage to a battery if it is overcharged. A user may also create a voltage level pattern that will benefit and protect the battery. For example, once a vehicle battery is at less than 10 volts, it is considered "dead". If a user owns a Honda Accord and the battery is completely discharged, they may determine that they want to charge the battery at 12 volts until the battery is 20% full, and then switch to 13 volts until the battery is fully recharged. A user can also set a voltage level pattern wherein the battery is recharged at 12 volts until it is 15% full, 12.5 volts until it is 30% full, 13 volts until it is 50% full, 14 volts until it is 70% full, 13 volts until it is 80% full, 12.5 volts until it is 90% full, and then 13.5 volts until it is 100% full. This method of incrementally increasing the voltage protects the battery but charges the battery faster than if it were to be entirely recharged at 12 volts.

In another embodiment, a user can manipulate the amount of time that the overhead battery charger charges a battery at a current level. For example, a car battery may have a capacity of about 48 amp hours. As such, to recharge the battery at 1 amp, it would require about 48 hours to fully recharge, and at 2 amps, it would require roughly 24 hours to fully recharge. An owner of a Hyundai Santa Fe with a discharged battery may create a current level pattern wherein the overhead battery charger charges at 1 amp for four hours, 8 amps for four hours, and then 2 amps for six hours—at which point the battery would be fully charged. By allowing a user to create current level patterns, the battery health is protected and the user can also speed up the charging process as desired, since charging at a higher current level reduces the time needed to recharge a battery. Likewise, a user can program a voltage level pattern that changes voltage after a certain amount of time. For example, they may dictate that for the first three hours of charging, the overhead battery charger charges at 12 volts, and then for 8 hours at 6 volts until full capacity.

In another embodiment, a user programs a current level pattern and a voltage level pattern that transpire simultaneously. For example, a Toyota Camry with a 12-volt battery is discharged. A user programs a current level pattern that charges the battery at 2 amps until it is 40% full, and then 6 amps until it is 60% full, and then 2 amps until it is 100% full. They set the voltage level pattern to charge at 12 volts until the battery is 40% full, 13 volts until the battery is 60% full, and 14 volts until the battery is 100% full. However, the current level pattern and voltage level pattern do not need to coincide. For example, a user sets the following current level. Pattern; 1 amp until 50% full, 10 amps until 90% full, 2 amps until 100% full. The voltage level pattern which will transpire during the same recharge is set to: 12 volts until 40% full, 12.5 volts until 50% full, 13 volts until 70% full, 13.5 volts until 95% full, 14 volts until 100% full. Additionally, a user may select a current level pattern with several current levels and set the voltage to remain constant during charging. Alternatively, a user may select a voltage level pattern but dictate that the current level remains constant during charging.

The overhead battery charger remote device may be a smart phone running an app. The app may display information regarding the health of the battery, such as the results of the load test. For example, it may display the output voltage of the battery when at rest, as well as the output voltage of the battery with a load. The app may also alert a user when the battery is fully charged, or when the battery is partially charged. For example, when the battery is 50% charged, a user may receive a notification from the app signaling that the battery is 50% charged. The app may have preset alerts. For example, the app will notify the user when the battery is 25% charged, when it is 50% charged, 75% charged, and 100% charged. Alternatively, a user may adjust app settings such that they only receive an alert when the battery is 50% charged and again when it is 100% charged. Or, a user may adjust the app such that they receive alerts at percentages they have selected.

Often, an individual owns various batteries with different characteristics. For example, the battery may be a 6-volt battery for a motorcycle, a 12-volt battery for a truck, and a 24-volt battery for a tractor. Likewise, the construction of the battery may vary, such as a lead-acid battery, a nickel-cadmium battery, a lithium ion or a lithium polymer battery. Such batteries may charge best under different settings—e.g. for varying lengths of time, in varying temperatures, and with varying current and voltage levels. In some instances, it may even be useful for some batteries, such as nickel-cadmium batteries, to be fully discharged by a battery charger before recharging them in order to reach their fullest charge and to improve longevity. After the first time that a battery is charged by the overhead battery charger, the overhead battery charger preferably retains the settings associated with that battery. For example, the first time a user charges the 6-volt motorcycle battery using the overhead battery charger, he may dictate that the battery charges at 6 volts and 2 amps until fully charged. Then, with the 12-volt truck battery, the user charges it at 13 volts and 2 amps until fully charged. The app may store this information and remember the battery and its characteristics in the future—including voltage level patterns or current level patterns that are programed by a user for a specific battery. As such, after a user initially charges a battery using the overhead battery charger, he may indicate on the app that it remember the settings used to charge that particular battery. A user may then give the battery a name, assign it an icon, or take a picture of it and upload it to the app. Thereafter, a user will not need to reselect previously entered settings for a stored battery. Instead, they may attach the battery connection devices, and indicate through the app which battery is connected to the overhead battery charger, and begin the charging process. In some embodiments, the battery charger may autodetect each battery it is connected to.

Additionally, batteries are often completely discharged because they go unused for a long period of time, or, specifically in the case of a vehicle battery, because they are not driven long enough distances for the alternator to recharge the battery. When a vehicle battery is completely discharged, a user may need to use their vehicle immediately, and they cannot wait hours for the battery to fully recharge at a low current level. In these instances, a jump is required to start the engine in the vehicle. To jump start a vehicle, in general between 300 and 400 amps or more for larger engines are. In one embodiment, the overhead battery charger is adapted to supply as many as 1000 amps. A user may indicate on the app that they want to jump their vehicle, connect the battery connection devices to the battery. The overhead battery charger can then jumpstart the vehicle so that the vehicle is ready for immediate use.

In another embodiment, the overhead battery charger includes a temperature sensor for reading the temperature of the battery as well as the ambient temperature. The ambient temperature and the battery temperature can be displayed on the app. If the battery reaches a temperature indicative of overheating, the user will receive an alert via the app, and the overhead battery charger will turn off to prevent damage. Additionally, the overhead battery charger may make adjustments to the current level and voltage level based on the ambient or battery temperature measurements. This is useful because weather and temperature affect how quickly and efficiently a battery can charge. For example, in cold weather, it may be unsafe to charge a battery as fully as in warmer weather.

The battery charging apparatus may be mounted to an overhead track, wherein it is linked to other smart devices and wherein it becomes part of a network controlled by a single remote device such as an app which may be run on a smart phone or computer. Additionally, the apparatus may be daisy chained to other similar or dissimilar devices. For example, the overhead battery charger can be used with the system described in US Appl. No 20170317504. Additionally, the apparatus may receive data from and deliver data to other smart devices. For example, the overhead battery charger can receive data, such as the ambient temperature, from the apparatus described in US Appl. No 20150284227.

Preferably, the overhead battery charger is adapted to tend a battery. Tending a battery is particularly useful when a battery will not be used for a long period of time. For example, a boat may be in storage for eight months or longer. During those months, the boat battery will slowly discharge until it is completely dead. In order to avert the battery dying, a tending mode can be used. The battery tender monitors the voltage of the battery, and when the voltage falls below a preset level, automatically begins charging, thus preventing a battery from becoming fully discharged. Once the battery is recharged to a preset voltage level, the charger discontinues charging, but continues to monitor the voltage of the battery. As such, a user may leave a battery connected to a charger equipped to tend indefinitely, because it does not continuously charge and is not at risk of overcharging and ruining the battery. In the app, a user has the option of selecting a battery tend mode, such that they may leave the battery connections devices connected to a battery for a long period of time (for example, eight months). They may also monitor the voltage of a battery that is tending via the app.

The appropriate tending voltage will vary depending on the battery as well as ambient temperature. Both extremely cold temperatures and extremely hot temperatures reduce charge acceptance, such that a user must warm up a battery or cool down a battery (respectively) before beginning the charging process. Additionally, ambient temperature affects the rate at which a battery charges. For example, in very cold weather, a charger cannot charge a battery as quickly as in moderate or warmer temperatures. Because a battery charger's ability to charge is affected by ambient temperature, it is best to use a charger at a constant temperature. However, over the course of a day or multiple days, temperature can fluctuate greatly. Consequently, it is advantageous to tend a battery over a short period of time, as to ensure even and complete charging. The overhead battery charger is preferably adapted to tend a battery by supplying the necessary current level to a discharging battery for a few days at a time, after which it turns off, although the battery connection devices may still be connected to the battery. As such, a user can attach the overhead battery charger to a battery, and indicate with the app that the overhead battery charger should tend the battery. Then, the user can leave the overhead battery charger attached to the battery for long periods of time, such as several weeks or months, without overcharging and subsequently damaging the battery.

When lead acid batteries are stored for long periods of time in a discharged state, lead-sulfur deposits can form on the lead plates of the battery. This causes a battery to become sulfated, which prevents a battery from recharging to its original fullest capacity. Additionally, overtime, sulfated batteries may lose their ability to hold any charge. However, it is possible to break up the sulfate on the battery such that the battery is restored to its original charge capacity by means of reconditioning. Reconditioning breaks up and dissolves sulfate deposits by pulsating high voltage through the battery. Similarly, with nickel-cadmium batteries (which are often found in toys or power tools) formation of crystalline cadmium reduces the battery performance by causing quick discharge and by reducing the charge capacity until they are unable to hold any charge. The crystalline formations are caused by overcharging, or by recharging before the battery is completely discharged. To destroy the crystals, a charger pulses high levels of voltage through the battery. This causes the crystals to dissolve, and the battery to regain its charge capacity. The overhead battery charger is preferably adapted to recondition batteries by pulsing high levels of current through batteries. A user may indicate to the overhead battery charger that it should recondition a battery through the app.

When a battery overheats, often due to overcharging, it may be at risk for explosion. Explosions or fires may occur when dangerous gasses such as hydrogen, sulfur dioxide, or hydrogen sulfide are emitted from the battery. A preferred embodiment of the overhead battery charger comprises a sensor for detecting hydrogen, sulfur dioxide, and hydrogen sulfide. Lead-acid batteries, which are commonly found in cars, SUVs, and trucks, are particularly susceptible to emitting hydrogen, sulfur dioxide, and hydrogen sulfide. This is because lead-acid batteries produce small amounts of hydrogen when charging and when discharging, and hydrogen is highly flammable. A sensor detects when the levels of hydrogen, sulfur dioxide, or hydrogen sulfide reach potentially dangerous levels, and turns off the overhead battery charger immediately and alerts a user via the remote device—which may be a smart phone running an app. In another embodiment, detection of unsafe levels of hydrogen, sulfur dioxide, or hydrogen sulfide initiate an alarm to sound through speakers on the overhead battery charger, thus audibly warning of imminent danger.

Sparks are dangerous in that they may cause fires or explosions. This is especially true considering that batteries, such as a lead-acid battery, may emit flammable gases such as hydrogen. As such, it is best to take precautions to avoid sparking near a battery—particularly when it is being charged. However, when attaching a battery charger to a battery, sparking often results if power is already available at the charger. The overhead battery charger is preferably configured to eliminate connection sparks so that a user may attach the battery connection devices while the overhead battery charger is off. Once the battery connection devices are connected to the battery, a user can turn on the overhead battery charger by the remote device, such as a smart phone running an app, and begin the charging process without causing sparks.

Now referring to FIG. 1A, the overhead battery charger 100 is shown attached to the ceiling. Alternatively, the overhead battery charger may be attached to a wall at sufficient height to be convenient for the user. The vehicle 102 is able to fit into the enclosed space and the overhead battery charger 100 takes up no floor space. Ideally, the overhead battery charger 100 is attached to an overhead, as to allow for more space in a garage or other room on the floor for storing other items or for moving around. The mounting hardware 103 allows the overhead battery charger 100 to attach to the ceiling. The overhead battery charger 100 may also be attached to an overhead track. The electric power source 104, such as an outlet, permits the overhead battery charger 100 to charge a battery. However, the overhead battery charger 100 may also receive electric power from other sources, such as a generator. The power cord housing 105 houses the power cable 107 and protects it from damage and also prevents the power cable from becoming tangled or from dangling down from the overhead and interfering with any object in the place wherein the overhead battery charger 100 is placed, such as a garage. The battery connection devices 101 connect to the battery and may be alligator clamps, or other battery connection devices. Wherein the battery connection devices 101 are equipped to attach to an electric vehicle, they are preferably one, two, or three-pronged.

Figure 1B:
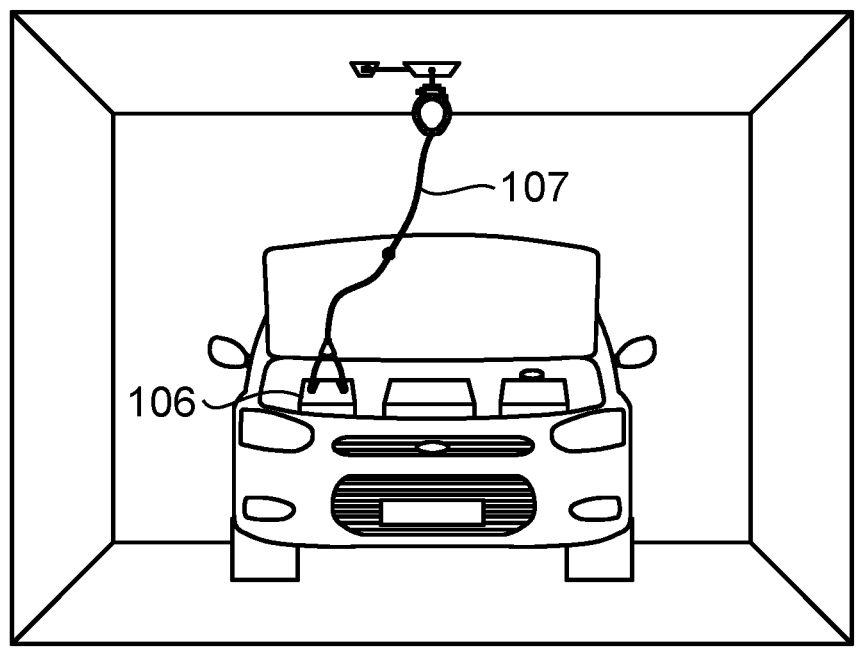
FIG. 1B is a front view of the overhead battery charger charging a vehicle's starting battery.

FIG. 1B depicts a vehicle starting battery 106 being charged by the overhead battery charger 100. The battery connection devices 101 are connected to the vehicle battery 106. Because the overhead battery charger 100 will likely be permanently placed in a position which is high enough that a user cannot reach it, the overhead battery charger 100 comprises voice commands allowing a user to command the overhead battery charger 100 to lower the power cables 107 such that a user is able to reach the battery connection devices 101 and attach them to a vehicle battery. Additionally, wherein the remote device is a smart phone running an app, a user may use the app to command the overhead battery charger 100 to lower the power cable 107 such that they can reach the battery connection devices 101.

The overhead battery charger 100 may charge at a constant current, or may charge at various current levels, as determined by the user. Charging the vehicle battery 106 at various levels influences the speed at which the vehicle battery 106 will charge. A user can also charge the vehicle battery 106 at a constant current level. The overhead battery charger 100 will alert a user once the vehicle battery 106 is fully charged and will also shut off the overhead battery charger 100 before it overcharges the vehicle battery 106, which protects the vehicle battery 106 from damage. The overhead battery charger 100 may alert the user that the vehicle battery 106 is fully charged via the remote device, which, for example, may be a smart phone or cell phone. When a vehicle battery 106 is completely drained or has not been in operation for a considerable amount of time, it is best for the battery to recharge at a very low amperage. However, once a battery is recharged to around 30%-40% of its full charge capacity, a trickle charge is no longer necessary to protect the health and longevity of the vehicle battery 106. At this point, a user may desire to speed up the charging process, which can be accomplished by increasing the amperage.

With the overhead battery charger 100, a user can preselect the various levels of current or amperages at which they would like the vehicle battery 106 to charge, and may also determine at what battery charge percentage they want the overhead battery charger 100 to change the level of current or amperage. Alternatively, a user may program the overhead battery charger 100 such that after a determined period of time, for example four hours, they want the overhead battery charger 100 to change the level of current or amperage. For example, a user may own an RV. Many RV owners do not use the RV in the winter months, during which the battery will slowly deplete and eventually die. When recharging the RV battery with the overhead battery charger 100, a user can attach the battery connection devices 101, (for example, in the case of a vehicle starting battery, alligator clamps) and set via the remote device that until the RV battery has recharged to 40% capacity, to charge at 2 amps, and that once the battery is 40% recharged, to switch to charging at 10 amps.

In another example, a user might begin to charge their vehicle battery 106 at a trickle charge of 1 amp. Then, a few hours into charging, a user can adjust the current level or amperage as the overhead battery charger 100 is charging without returning to the vehicle. That is to say, a user can select the current level pattern that will completely recharge the vehicle battery 106 before attaching the battery connection devices 101 to the vehicle battery 106, or they can make live adjustments to the current level as the vehicle battery 106 is recharging. A user may set and control in real time the current level or voltage level via the remote device, which remote device may be a smart phone running an app. The app may also comprise other settings, such as alerting a user when charging is complete, or when a battery is sufficiently charged such that a user could resume using the vehicle, appliance or tool—even though the battery is not fully recharged. The app may also be used to display an estimation of the time it will take to charge the battery. The app may also be used to display the progress during charging, such as by the familiar thermometer or hourglass icons.

Figure 2A:
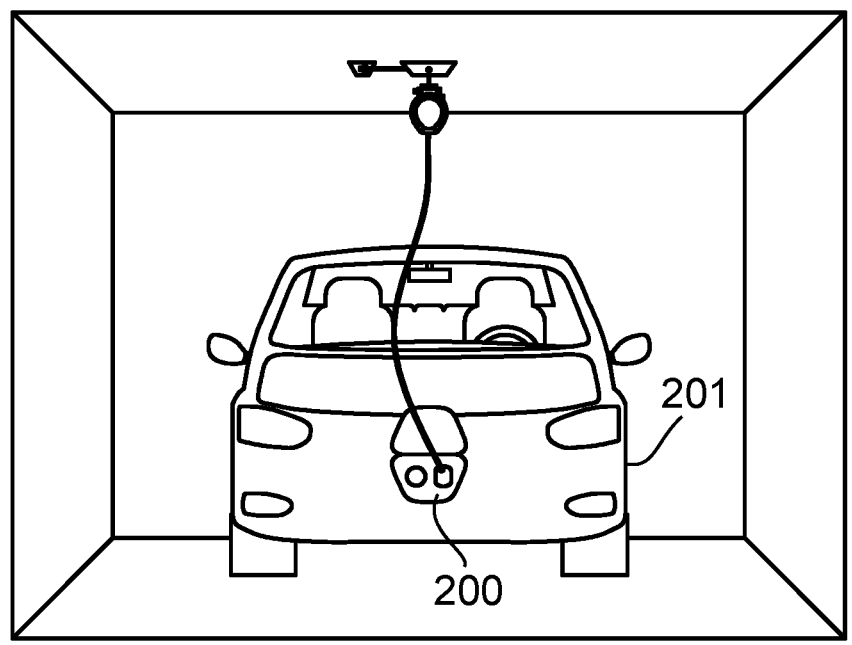
FIG. 2A is a front view of the overhead battery charger charging an electric vehicle.

FIG. 2A depicts the overhead battery charger 100 with a battery connection device 101 equipped for charging an electric vehicle, 201.

Figure 2B:
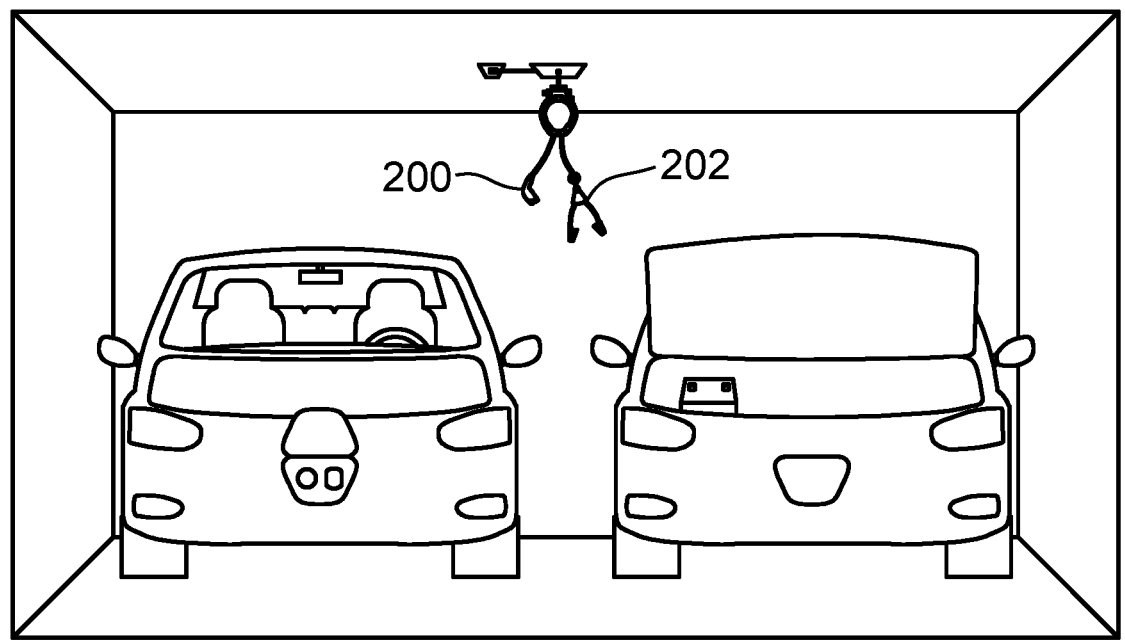
FIG. 2B is a front view of the overhead battery charger equipped with battery connections devices for both an electric vehicle and a non-electric vehicle.

FIG. 2B depicts an overhead battery charger 100 with two types of battery connection devices 101. The electric car connection device 200 and the vehicle starting battery connection device 202 are attached to two separate power cables 107. However, in another embodiment, the electric car connection device 200 and the vehicle starting battery connection device 202 are both attached to the same power cable 107.

Figure 3:
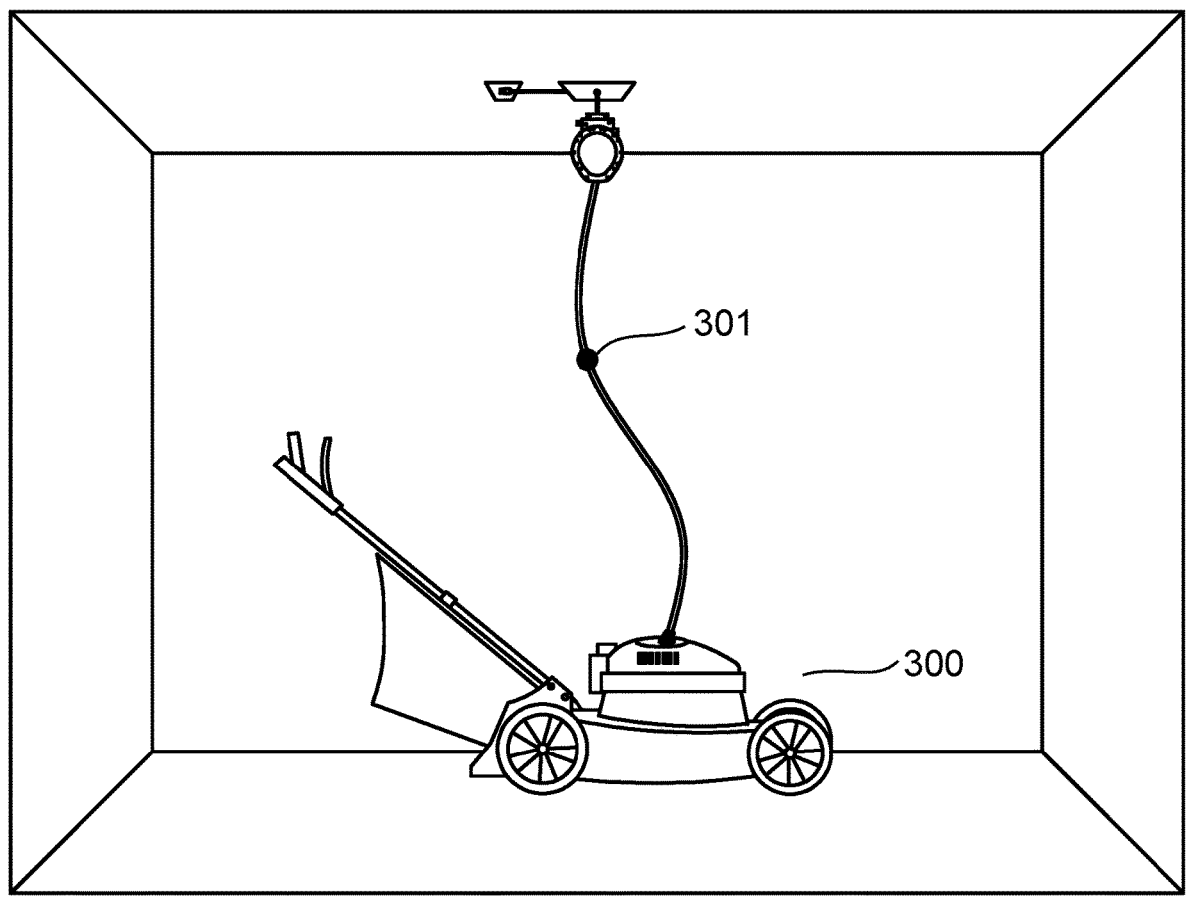
FIG. 3 is a side view of the overhead battery charger charging a lawnmower.

FIG. 3 depicts a battery-powered lawn mower 300 attached to the overhead battery charger 100. The overhead battery charger 100 may attach to a variety of battery-powered appliances, tools or vehicles, such as motorcycles, tractors, RVs, ATVs, UTV side-by-sides, or trailers.

All patents and published patent applications referred to herein are incorporated herein by reference. The invention has been described with reference to various specific and preferred embodiments and techniques. Nevertheless, it understood that many variations and modifications may be made while remaining within the spirit and scope of the invention.

What is claimed is:

1. An overhead battery charger comprising:
   mounting hardware that attaches the overhead battery charger to a ceiling or a wall;
   a charging circuit having an input and an output, wherein the charging circuit receives electrical power at the input and that selectively provides at least one of a voltage level and a current level to the output;
   a power cord connected to the output of the charging circuit;

a battery connection device connected to the power cord;
a wireless radio;
a housing that houses the charging circuit, the power cord, and the wireless radio; and
a controller that includes instructions that are executable by the controller to cause the controller to:
control the voltage level, the current level, or both provided by the charging circuit;
receive a first command from a remote device via the wireless radio, wherein the remote device is separate from the overhead battery charger;
lower the power cord from the housing based on the first command;
detect when the battery connection device is connected to a battery;
receive a second command from the remote device via the wireless radio;
turn on the charging circuit to charge the battery based on the second command and the detection that the battery connection device is connected to the battery;
receive a third command from the remote device via the wireless radio; and
adjust the voltage level, the current level, or both based on the third command.

2. The invention of claim 1, wherein the third command is a command to provide a current level pattern, and wherein the controller controls the charging circuit to provide the current level pattern.

3. The invention of claim 2, wherein the third command is a command to provide a voltage level pattern, and wherein the controller controls the charging circuit to provide the voltage level pattern.

4. The invention of claim 3, wherein the current level pattern, voltage level pattern, or both are a preset pattern available through the controller.

5. The invention of claim 1, wherein the current level, the voltage level, or both remain constant during charging.

6. The invention of claim 3, wherein the instructions to adjust the voltage level, the current level, or both comprise instructions to adjust the current level, the voltage level, or both while the charging circuit is charging.

7. The invention of claim 1, wherein the instructions are further executable by the controller to provide feedback to the remote device on the status of a battery being charged.

8. The invention of claim 1, wherein the first command comprises
a voice command.

9. The invention of claim 1, wherein the battery connection device is adapted to connect to an electric vehicle.

10. The invention of claim 1, wherein the battery connection device is adapted to connect to a vehicle battery.

11. The invention of claim 1, wherein the battery connection device comprises at least two battery connection devices, whereby more than one type of battery can be charged.

12. The invention of claim 1, wherein the instructions are further executable by the controller to:
detect a type of the battery; and
automatically adjust the voltage level and/or the current level based on the detected type of the battery.

13. The invention of claim 12, wherein the instructions are further executable by the controller to store charging settings for each type of battery, wherein the charging settings include at least one of a preferred voltage level, a preferred current level, a preferred voltage level pattern, a preferred current level pattern, a preferred charging time, a preferred charging capacity, and a preferred charging temperature, such that when a battery is reconnected to the overhead battery charger, the stored charging settings are applied.

14. The invention of claim 11, wherein the at least two battery connection devices comprise a first battery connection device to connect to and charge a vehicle starting battery and a second battery connection device to connect to and charge an electric vehicle.

15. The invention of claim 1, wherein the remote device is a smart device running an app.

16. The invention of claim 14, wherein the smart device running an app is adapted to display feedback to the user on the status of the battery during charging.

17. The invention of claim 1, wherein the overhead battery charger stores previous current level patterns, voltage level patterns, or both as received from the remote device.

18. The invention of claim 1, wherein the instructions are further executable by the controller to perform a load test on a battery.

19. The invention of claim 18, wherein the instructions are further executable by the controller to determine charging settings for the battery based on the results of the load test.

20. The invention of claim 1, further comprising a temperature sensor that measures an ambient temperature, a battery temperature, or both.

21. The invention of claim 1, wherein the instructions are further executable by the controller to recondition a battery.

22. The invention of claim 1, further comprising a sensor that detects hydrogen, sulfur dioxide, hydrogen sulfide, or a combination thereof.

23. The invention of claim 1, wherein the instructions are further executable by the controller to jumpstart a vehicle.

* * * * *